J. W. BRUCE.
TRACTION VEHICLE.
APPLICATION FILED SEPT. 2, 1913.

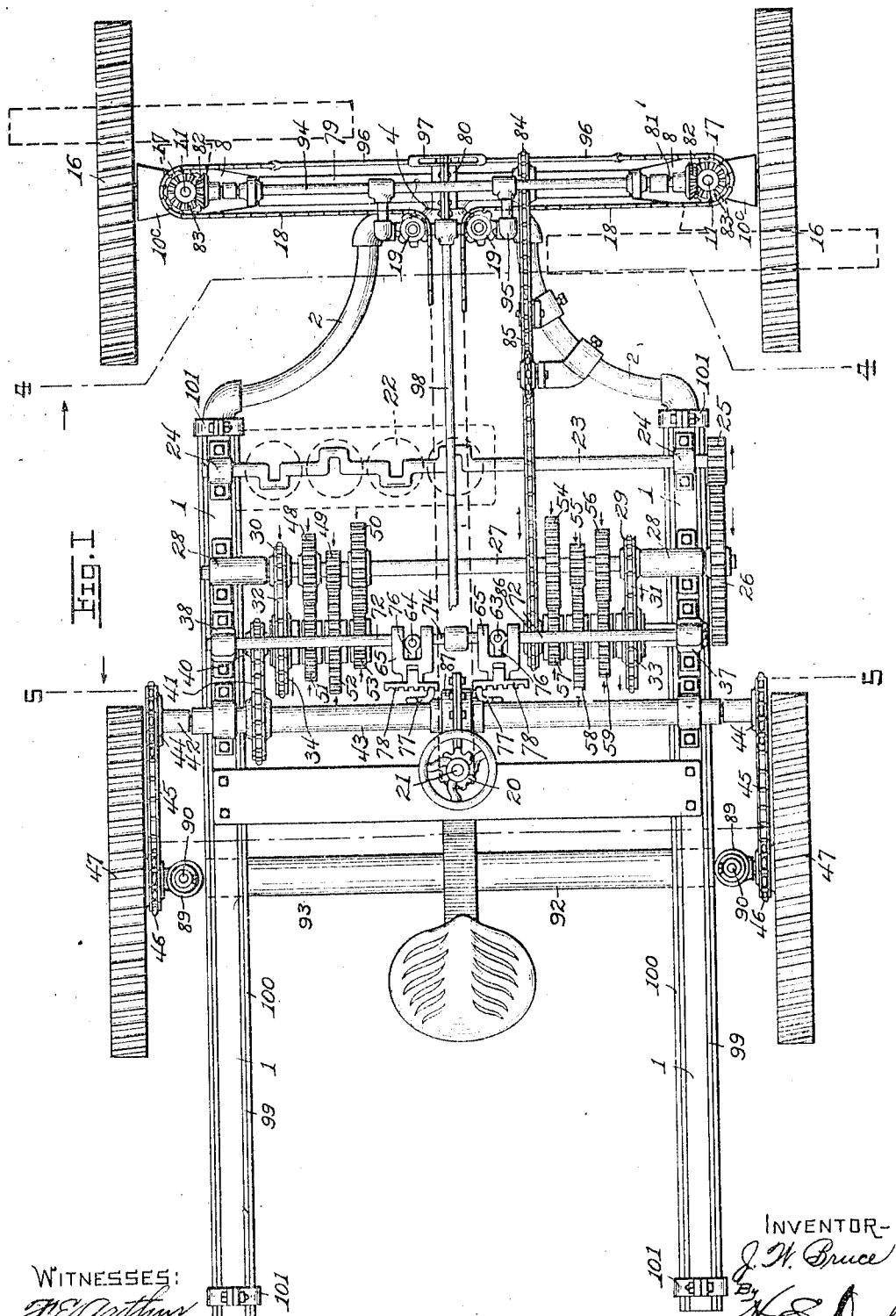

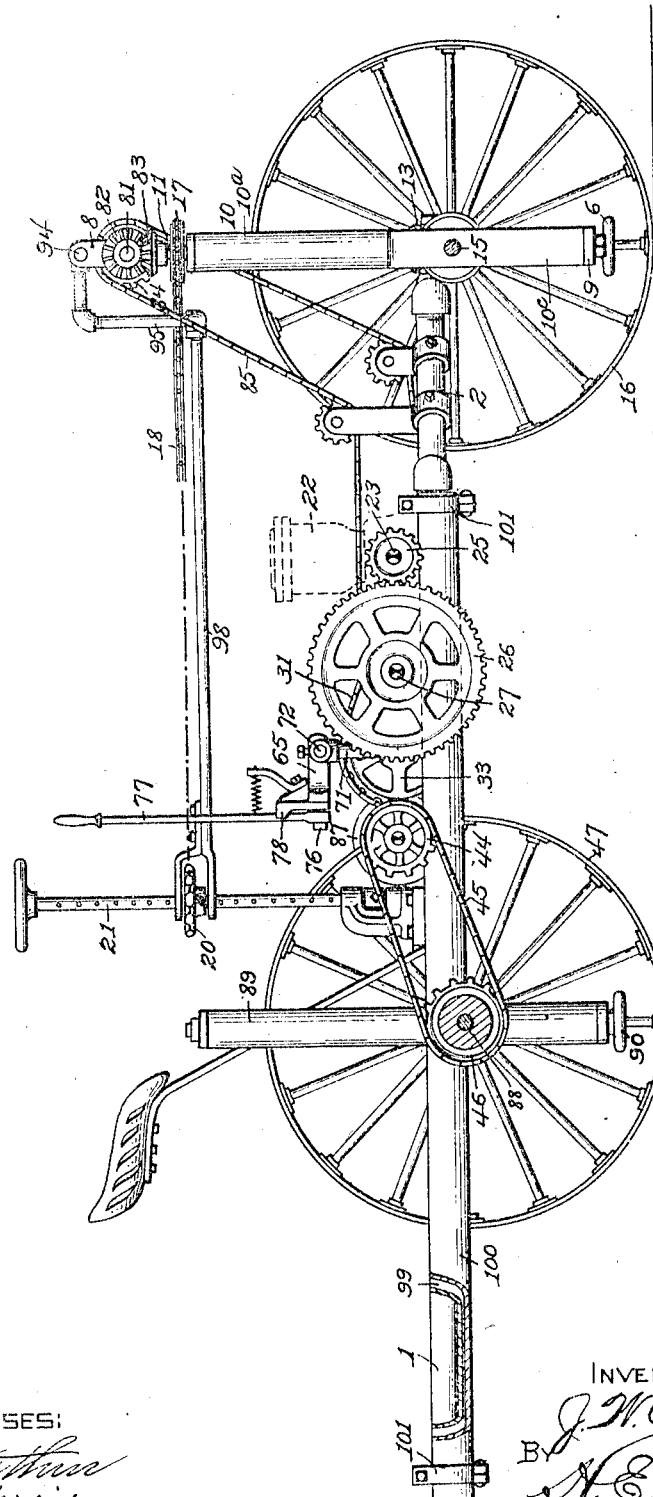

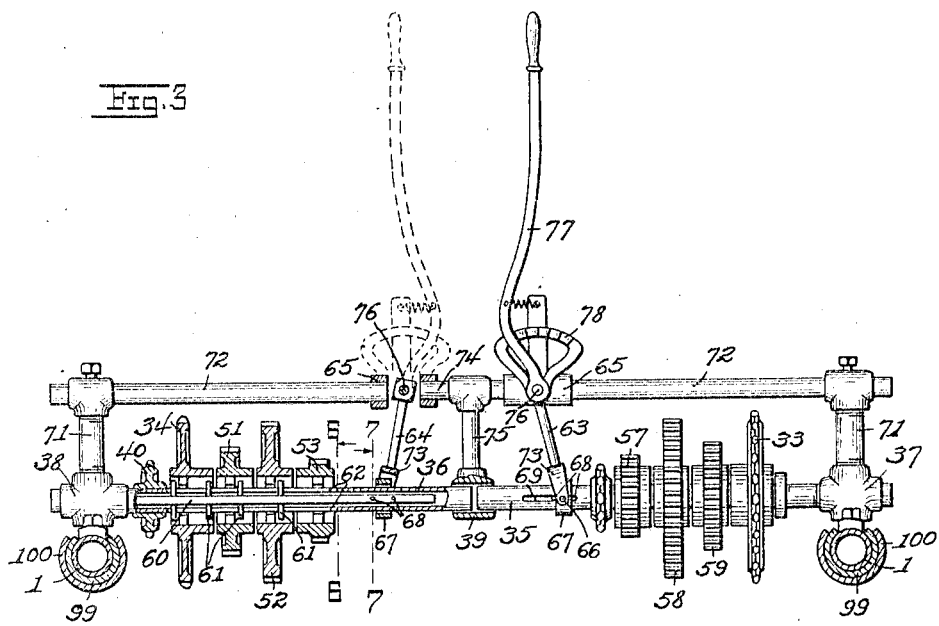
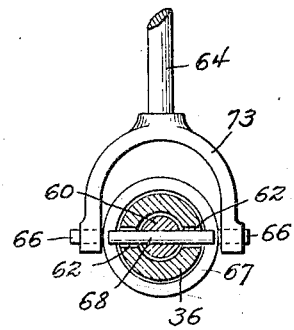
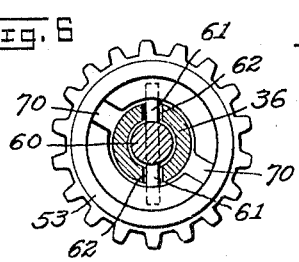
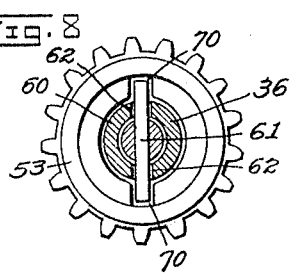

1,118,528.

Patented Nov. 24, 1914.
5 SHEETS—SHEET 4.

WITNESSES:
F. E. Arthur
L. D. Morris.

INVENTOR
J. W. Bruce
By N. E. Dunlap
ATTORNEY.

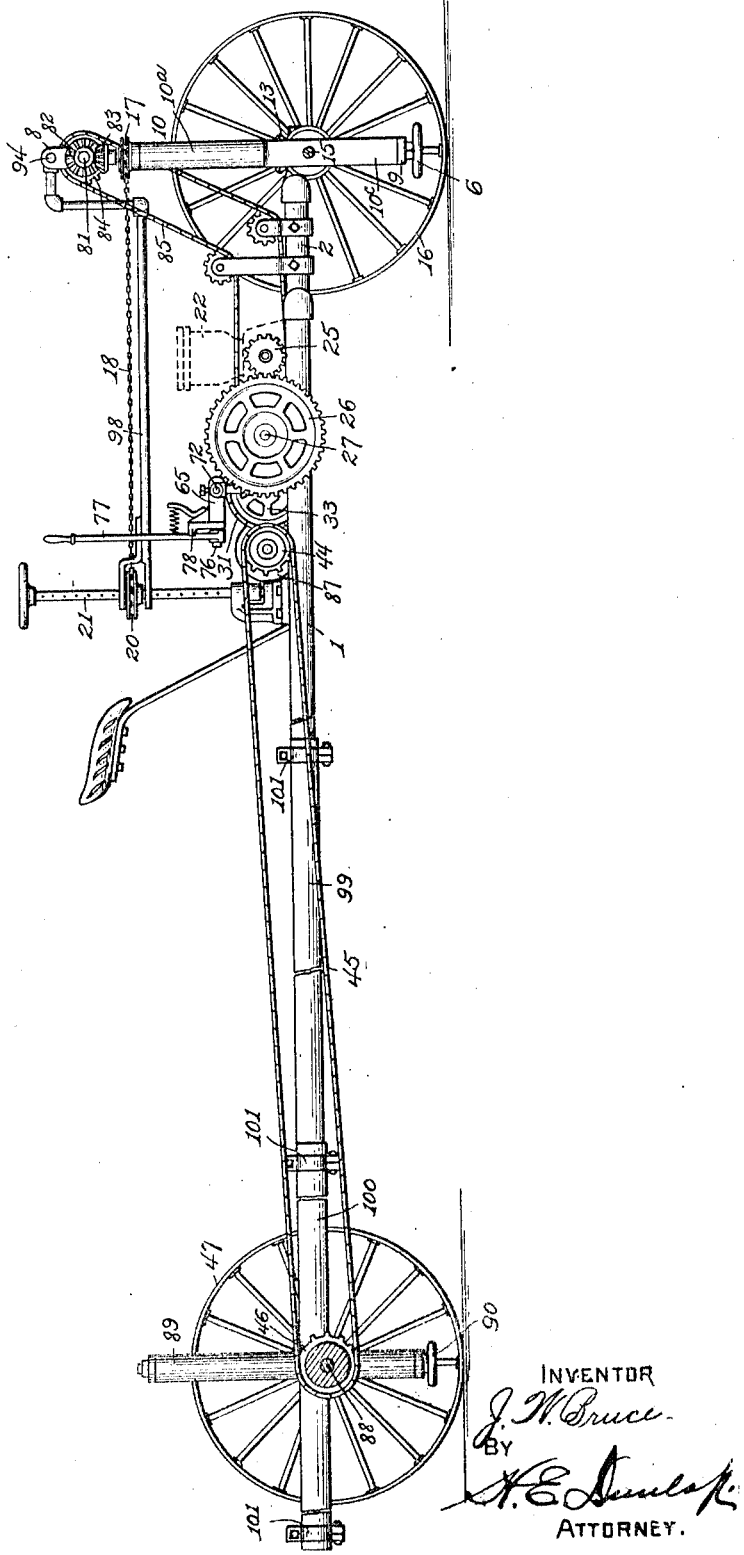

UNITED STATES PATENT OFFICE.

JAMES WESLEY BRUCE, OF OZARK, OHIO.

TRACTION-VEHICLE.

1,118,528.  Specification of Letters Patent.  Patented Nov. 24, 1914.

Application filed September 2, 1913. Serial No. 787,581.

*To all whom it may concern:*

Be it known that I, JAMES WESLEY BRUCE, a citizen of the United States of America, and resident of Ozark, county of Monroe, and State of Ohio, have invented certain new and useful Improvements in Traction-Vehicles, of which the following is a specification.

This invention relates broadly to agricultural apparatus, and more specifically to a traction, or self-propelled, vehicle adapted for driving farm machinery of various types.

The primary object of the invention is to provide a traction vehicle specially designed for farm use whereby various kinds or types of agricultural implements, such as mowers, cultivators, and the like may be propelled.

A further object is to provide a vehicle of the character mentioned having an extension frame which may be adjusted in length to accommodate bodies or beds of varying sizes.

A further object is to provide a traction vehicle of simple and comparatively inexpensive construction having a change speed transmission of a simple type which permits of numerous changes of speed and power ratios, adapting the device for widely varying uses. And a still further object is to provide a vehicle which may be conveniently turned within a relatively short radius.

Another object within the contemplation of this invention is to provide a vehicle of the character mentioned having a fore-wheel drive as well as the usual rear wheel drive.

With these and other important objects in view, all of which will hereinafter be pointed out or made apparent, the invention resides in the features of construction, arrangement of parts and combinations of elements which will hereinafter be exemplified, reference being had to the accompanying drawings, forming a part of this specification, in which—

Figure 4:
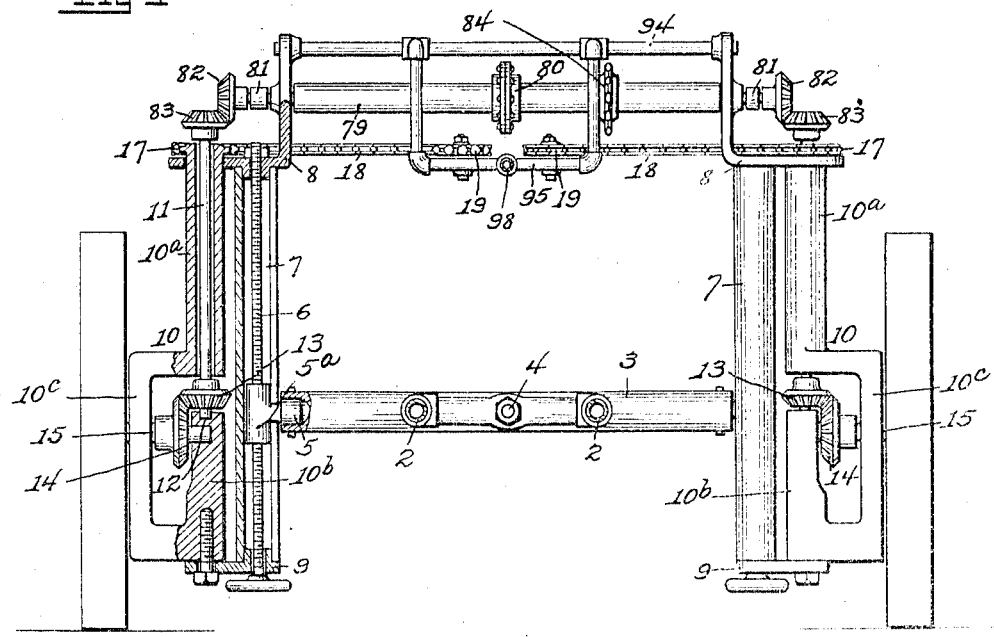
Figure 5:
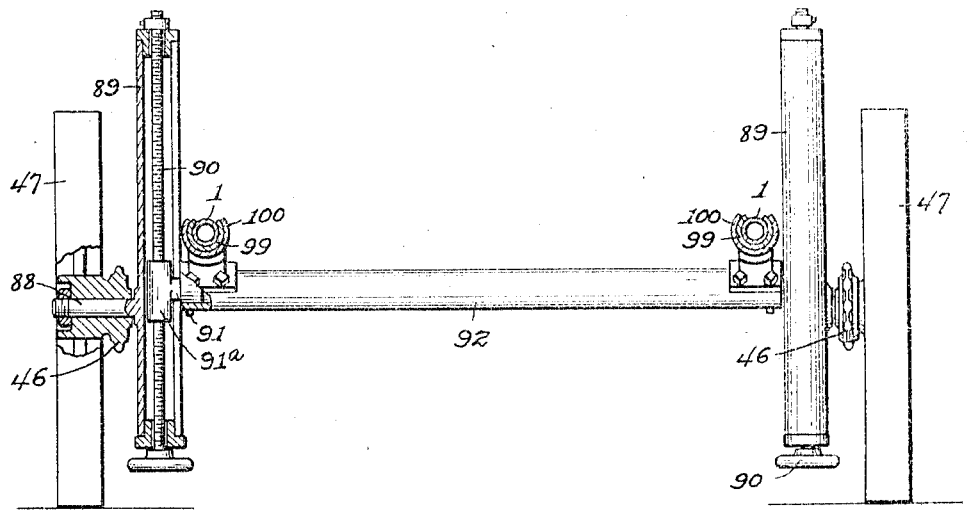

Figure 1 is a top plan view of the invention showing the frame occupying closed position, some of the parts being shown broken away for the sake of clearness; Fig. 2 is a longitudinal section taken through the axles at a point close to the traction wheels, showing a side elevation of the mechanism; Fig. 3 is a transverse section taken substantially on the line of the change-gear shafts; Fig. 4 is a section on the line 4—4, Fig. 1; Fig. 5 is a section on the line 5—5, Fig. 1; Fig. 6 is an enlarged section taken on the line 6—6, Fig. 3; Fig. 7 is a section on the line 7—7, Fig. 3, showing the clutch in operative position; Fig. 8 is a similar section showing the clutch in shifting position; and Fig. 9 is a view similar to Fig. 2, reduced, showing the frame extended.

Referring to said drawings, in which like designating characters distinguish like parts throughout the several views—1 indicates fixed side portions of a frame, which portions are of tubular form and are connected at their front ends to inwardly curved frame members 2 which are mounted at their front ends upon, or have swivel-like connections with, an axle 3, as shown at 4. Said axle is preferably of tubular form, as shown in Fig. 4, and has rigidly connected to its ends projecting alined stems 5 having integral threaded sleeve-like guides $5^a$ mounted upon vertical adjusting screws 6 which are directed upward through slotted tubular casings 7. Said casings 7 are fixed at their upper and lower ends respectively to brackets 8 and 9 which have pivotally mounted therein the upper and lower ends respectively of angular steering members 10. Revolubly mounted in an upper sleeve portion $10^a$ of each steering member is a shaft 11 whose lower end is seated in a socket 12 provided in an upright portion $10^b$ of said member. Fixed on said shaft 11 and occupying a position between the sleeve portion $10^a$ and the portion $10^b$ is a bevel gear 13 which meshes with a similar gear 14 fixed on a spindle 15 which is journaled in said portion $10^b$ and in an outward bow $10^c$ which connects said portions $10^a$ and $10^b$. The outer ends of said spindles 15 have the front wheels 16 of the vehicle fixedly mounted thereon.

As means for steering the front wheels of the vehicle, sprocket wheels 17 are fixed to the sleeve portions $10^a$ of the steering members 10, and a sprocket chain 18 is disposed transversely to connect said sprocket wheels and is thence directed inward from each of said wheels to and around a pair of sprocket wheels 19 which are suitably mounted at points at the rear of the vertical plane occupied by the front axle 3, and is thence directed rearward to and around a sprocket wheel 20 fixed upon a steering column 21 located at a convenient point to be manipulated by the operator, or driver.

The engine, or motor, 22, indicated in dotted lines in Figs. 1 and 2, is mounted on the frame in any suitable manner and has its crank-shaft 23 journaled in bearings 24 mounted on the side portions 1 of said frame. A pinion 25 mounted on said crank-shaft meshes with a gear wheel 26 fixed on a drive-shaft 27 journaled in bearings 28 mounted on said side portions 1. Sprocket wheels 29 and 30 carried by said drive-shaft adjacent to its opposite ends are connected by sprocket-chains 31 and 32 to sprocket wheels 33 and 34 carried by a pair of alined transversely disposed shafts 35 and 36 which lie parallel to said shaft 27. Said shafts 35 and 36 have their outer ends journaled respectively in bearings 37 and 38 mounted on the opposite side portions 1 and have their inner ends journaled in a suitably mounted common bearing 39, as is most clearly shown in Fig. 3.

Motion communicated to the crank-shaft 23 is communicated through the pinion 25 and gear 26 to the drive shaft 27 which is constantly driven in a rearward direction; and said drive-shaft 27 in turn communicates motion through the sprocket chains 31 and 32 to both said shafts 35 and 36. Said shaft 36 has a sprocket wheel 40 fixed thereon which is connected by a sprocket chain 41 to a sprocket wheel mounted on a tubular member 43 whereby motion is communicated to shafts 42 inclosed thereby. The opposite ends of said shafts 42 carry sprocket wheels 44 which are connected by sprocket chains 45 to sprockets 46 which may be formed on the hubs of the rear traction wheels 47 of the vehicle, or may be mounted in any convenient manner whereby the latter are driven.

A series of gear wheels, as 48, 49 and 50, are fixed upon the drive-shaft 27 and are permanently in mesh with gear-wheels 51, 52 and 53, respectively, which are revolubly mounted on the shaft 36. The shaft 27 also has fixed thereon a second series of gear wheels, as 54, 55 and 56 which are permanently in mesh with gear-wheels 57, 58 and 59, respectively, which are revolubly mounted on the shaft 35. Each of said shafts 35 and 36 is made hollow, as shown in Fig. 3, and has a rod 60 mounted therein so as to be longitudinally movable, said rod having fixed thereto one or more radial pins or studs 61 which constitute a clutch, projecting outward through oppositely disposed slots 62 provided in said shafts 35 and 36, as shown in Figs. 3, 6 and 8. While a plurality of the pins or studs 61, spaced at proper distances apart, are herein shown, it will be obvious that a single pin occupying the position of the outermost pin in Fig. 3 will suffice. Levers 63 and 64 are respectively provided whereby the rods 60 in the shafts 35 and 36 may be shifted longitudinally to different positions, each of said levers being connected to a yoke 73 which has its terminals journaled on oppositely disposed trunnions 66 carried by a collar 67 which is slidably mounted on the shaft between the projecting ends of two pins 68 directed centrally through the rod 60 and operating longitudinally in oppositely disposed slots 69 provided therefor in said shaft.

As is obvious, all of the gears on the shafts 35 and 36 are driven idly until the inclosed rod is shifted to a point where one of the pins or studs 61 thereof enters internal recesses 70 provided in said gears, whereupon the gear so engaged will be interlocked with the shaft on which it is mounted, causing said shaft to rotate therewith. The gears may be arranged in any suitable or appropriate manner to facilitate the changing thereof to produce variations in speed at a given speed of the engine shaft. One set or series of gears is preferably employed for effecting the forward drive of the traction wheels, while the other series is employed for reversing.

It will be noted that sprocket wheels 33 and 34 are loose on their shafts, and that when the clutches are caused to engage said sprockets the vehicle wheels will be driven rearward. When the vehicle wheels are to be driven forward, the clutches are shifted into one of the various change speed gears.

Upright arms 71 support the outer ends of transverse rods 72 which are disposed in alined relation, as shown in Figs. 1 and 3. The inner ends of said rods 72 are rigidly supported in the adjacent arms of two yoke-like members 65, the opposite arms of which support therein a short rod 74 from which depends an arm 75 that supports the bearing 39 for the shafts 35 and 36. The upper end of each of the levers 63 and 64 is slidably mounted in the head of a short rearwardly extending rod 76 upon the rear end of which is fixed a substantially upright lever-arm 77 designed for hand operation. Said hand-lever as herein shown operates against the toothed or notched face of a stationary bar 78 carried by the yoke member 65, so that it will be firmly held in any adjusted position, but it is obvious that the form of the hand-lever and that of the bar with which it coacts may be varied as desired.

Journaled in upright portions of the brackets 8 and operating within a transverse tubular member 79 and having their inner ends in operative relation to a suitable differential gear (not shown) inclosed by a housing 80 is a pair of alined shafts 81, each of which has fixed on its outer end a bevel-gear 82 in mesh with a bevel-gear 83 carried upon the upper end of the adjacent shaft 11. Said shafts are driven from the shaft 25, the latter having a sprocket wheel 86 fixed thereon and connected by a sprocket chain 85 to a sprocket wheel 84 fixed on tubular member 79. The differential gear inclosed by said housing 80 is designed to allow one shaft 81 to overrun its companion shaft in the usual manner.

A differential gear (not shown) is incased by a housing 87, providing in the usual manner for allowing one shaft 42 to overrun its companion shaft as required.

Formed integral with, or rigidly supported by, the spindle 88 for each rear traction wheel 47 is an upright tubular casing 89, similar to the casings 7 hereinbefore referred to, through which extends a vertical adjusting screw 90 upon which is mounted a threaded sleeve-like guide 91ª carried by a stem 91 which has rigid supporting relation to the adjacent end of a rear axle member 92. As is obvious, by manipulation of the adjusting screws 90 the axle member 92 may be adjusted to any point desired, thus adapting the same for elevation to enable the vehicle to straddle rows of plants, standing corn, or the like, as when the vehicle is employed for propelling cultivators or the like. A transverse rod 94 connects the brackets 8 at the front end of the vehicle for giving rigidity to the parts, and also serves as a support for a mounting 95 for the sprocket wheels 19 about which the steering chain 18 operates. The said steering chain 18 preferably has a pair of alined rods 96 disposed in its front transverse portion, as shown in Fig. 1, the same being connected by a turnbuckle 97 whereby the tension of said chain may be adjusted.

A rod 98 connects the mounting 95 to the steering column 21, for increasing the relative rigidity of said parts. The vehicle is designed particularly for farm use, where it may be employed for propelling various kinds of machinery and farm apparatus, the sleeve-like bearings 28 affording places for connections for such machinery or apparatus; or a bed or body may be mounted on the frame over the rear axle, said frame being composed of a plurality of telescopic sections. The portions or sections 1 of said frame are tubular in form and are stationary with respect to curved frame members 2. Mounted in embracing telescopic relation to each section 1 is a section 99, and a third and similar section 100 is mounted in stationary position on the rear axle and in embracing telescopic relation to said section 99. When it is desired to lengthen the frame, the front wheels are driven forward while the rear wheels remain stationary, drawing said frame sections outward telescopically with respect to each other. As shown most clearly in Fig. 5, each of the sections 99 and 100 is slotted longitudinally so that movement thereof with respect to section 1 may be accomplished without interference from the various bearings which are rigidly mounted on said section 1. A plurality of adjustable clamps 101 are provided at suitable intervals whereby said sections may be clamped in adjusted position.

As is clearly illustrated in Fig. 1, the front wheels 16 have a maximum of clearance, the form of the frame permitting said wheels to be turned at substantially a right angle to the axial line of the vehicle, as indicated in dotted lines in said figure.

Having thus described my invention, what I claim as new, and desire to secure by Letters Patent, is—

1. A traction vehicle comprising front and rear axles, a frame supported by said axles, a source of motive power sustained by said frame, means including adjusting screws for adjusting the elevation of said axles, steering members having pivotal supporting relation to the adjusting means for the front axle, spindles rotatably mounted in said steering members, wheels fixed upon said spindles, means for turning said members for directing the course of said wheels, a vertical shaft rotatably mounted in each steering member, intermeshing bevel gears carried by said shafts and the adjacent spindles, bevel gears carried by the upper ends of said shafts, alined shafts disposed between the last mentioned bevel gears and having bevel gear connection with the latter, a differential gear between the alined shafts, a change-speed train of gearing associated with the source of motive power, and means communicating power from the latter to said alined shafts.

2. A traction vehicle comprising front and rear axles, a frame supported by said axles, a source of motive power sustained by said frame, means including adjusting screws for adjusting the elevation of said axles, steering members having pivotal supporting relation to the adjusting means for the front axle, spindles rotatably mounted in said steering members, wheels fixed upon said spindles, means for turning said members for directing the course of said wheels, a vertical shaft rotatably mounted in each steering member, intermeshing bevel gears carried by said shafts and the adjacent spindles, bevel gears carried by the upper ends of said shafts, alined shafts disposed between the last mentioned bevel gears and having bevel gear connection with the latter, a differential gear between the alined shafts, a change-speed train of gearing associated with the source of motive power, means communicating power from the latter to said alined shafts, and means communicating power from said change-speed gearing to the rear wheels.

3. A traction vehicle comprising front and rear axles, a frame composed of telescopic sections mounted upon said axles, a source of motive power sustained by the foremost of said telescopic frame sections, upright stationary slotted casings located adjacent to each end of each axle and receiving the axle ends therein, adjusting screws directed vertically through said casings and adapted for adjusting the elevation of said axles, the rear casings having spindles in fixed relation thereto, wheels rotatably mounted on said spindles, steering members having pivotal supporting relation to the receiving casings for the front axle, spindles rotatably mounted in said steering members, wheels fixed upon said spindles, means for turning said members for directing the course of the last-mentioned wheels, gearing associated with said rotatable spindles, change-speed gearing interposed between the source of motive power and said spindle gearing for driving the latter, and means interposed between said change-speed gearing and the rear wheels for driving the latter.

In testimony whereof, I affix my signature in presence of two subscribing witnesses.

JAMES WESLEY BR[...]

Witnesses:
J. A. BROWN,
M. M. BROWN.